UNITED STATES PATENT OFFICE.

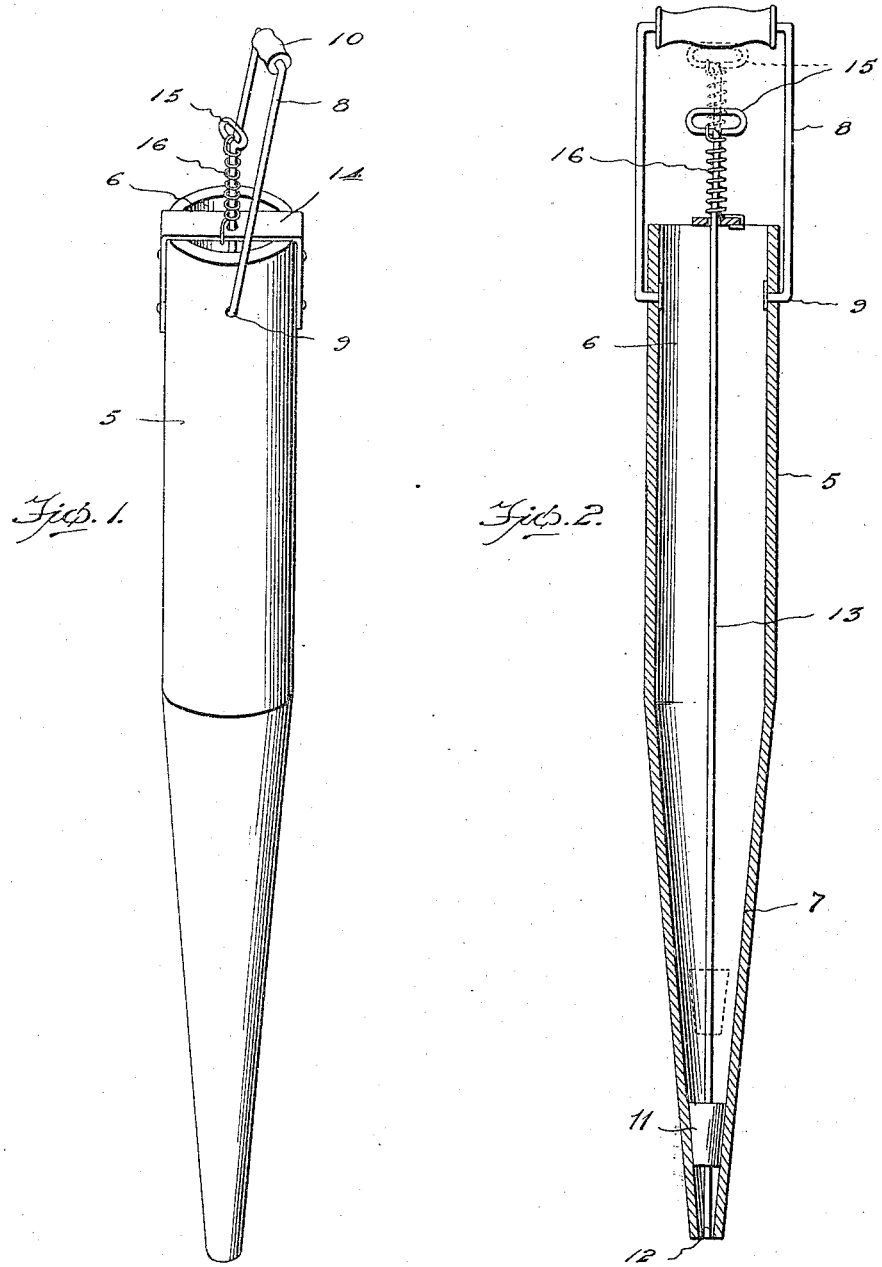

JOHN E. JONASSON, OF BOW, WASHINGTON.

IRRIGATOR.

1,228,777.   Specification of Letters Patent.   Patented June 5, 1917.

Application filed July 16, 1915. Serial No. 40,292.

*To all whom it may concern:*

Be it known that I, JOHN E. JONASSON, a citizen of the United States, residing at Bow, in the county of Skagit and State of Washington, have invented certain new and useful Improvements in Irrigators; and I do hereby declare the following to be a full, clear, and exact description of the invention, such as will enable others skilled in the art to which it appertains to make and use the same.

This invention relates to irrigators, and has for its object to provide an efficient and inexpensive device adapted for insertion in the earth for effectively irrigating or watering the roots of flowers, vegetables and the like.

Another object is the provision of an irrigator including a hollow body constituting a liquid container and having one end tapered and adapted for insertion in the earth, and a conveniently operable valve for controlling the flow of water from said container.

With these and other objects in view, the invention consists in the novel construction, arrangement and formation of parts as will be hereinafter specifically described, claimed and illustrated in the accompanying drawing, in which:

Figure 1 represents a perspective view of the improved irrigator, and

Fig. 2 represents a longitudinal sectional view therethrough.

Referring to the drawing in detail, wherein similar reference numerals designate corresponding parts throughout the several views, the numeral 5 indicates the body of the irrigator having an open upper end 6 and a tapered lower extremity 7 to facilitate insertion in the earth. A substantially U-shaped handle 8 is pivotally secured in apertures 9 formed adjacent the open end 6 of the body and is provided with a hand grip 10, whereby the irrigator may be conveniently carried.

A frusto-conical valve 11 is slidably mounted in the tapered end 7 of the body and is adapted, when properly adjusted, to contact the inner surface of the tapered end of said body to stop the flow of water from the upper portion of the body through the discharge opening 12 thereof. A stem 13 is secured centrally within the frusto-conical valve 11, extends longitudinally within the body 5 and is slidably supported at its upper extremity in the web portion of a U-shaped guide 14 which is arranged at right angles to the handle 8 and is secured over the open end 6. The upper extremity of the valve stem or rod 13 is looped, as indicated at 15, to provide a handle located conveniently near the grip 10 whereby the finger of the operator may be slipped into the handle 15 to move the stem 13 longitudinally to open the valve 11. A spring 16 is coiled about the exposed end of the stem 13 and is connected at one end with the handle 15 and at the opposite end with the bearing member 14 and normally retains the valve 11 in closed position.

In use, the valve 11 is normally retained in closed position by the tension of the spring 16 and the portion of the hollow cylindrical body 5 above the valve is filled with water or any other desired irrigating liquid poured through the open end 6. To irrigate the roots of a flower, vegetable or other plant the tapered extremity 7 of the body is inserted in the earth adjacent the plant, and the valve 11 is opened by drawing upwardly upon the handle 15, thus permitting the water in the upper portion of the body to flow through the discharge end 12 and into the earth at a point adjacent the roots of the plant. As clearly illustrated in dotted lines in Fig. 2, the handle 15 may be moved against the hand grip 10 and thus firmly and conveniently held by one hand to retain the valve 11 in open position during the operation of the irrigator.

What I claim is:

An irrigator including a hollow body having an open filling end and a tapered discharge end, a U-shaped handle having the free ends pivotally secured at diametrically opposed points to the open end of said body, a valve slidably mounted in the tapered portion of said body, a stem carried by said valve projecting outwardly of the open end of the body and being looped to provide a handle, a U-shaped guide secured to the open end of said body and including a web portion extending diametrically across the open end and slidably receiving said stem, and a contractile spring coiled about said stem, secured at one end to the web portion of said guide and at the opposite end to the handle loop and normally retaining the valve in closed position.

In testimony whereof I affix my signature in presence of two witnesses.

JOHN E. JONASSON.

Witnesses:
GEO. KNUTZEN,
W. D. KNIPE.

Copies of this patent may be obtained for five cents each, by addressing the "Commissioner of Patents, Washington, D. C."